United States Patent [19]

Middleton et al.

[11] Patent Number: 4,665,516
[45] Date of Patent: May 12, 1987

[54] INFORMATION TRANSPORT SYSTEM EMPLOYING TELEPHONE LINES

[75] Inventors: Francisco A. Middleton; Franklin Hargrave, both of Newtown; John E. Cox, Stamford, all of Conn.

[73] Assignee: ITT Corporation, New York, N.Y.

[21] Appl. No.: 648,542

[22] Filed: Sep. 7, 1984

[51] Int. Cl.[4] .......................... H04J 1/02; H04M 11/00
[52] U.S. Cl. .................... 370/76; 340/870.07; 379/93; 379/107
[58] Field of Search ............ 370/76, 74, 96, 92; 340/870.07, 870.11, 825.52; 179/2 DP; 379/102, 106, 107

[56] References Cited

U.S. PATENT DOCUMENTS

| | | | |
|---|---|---|---|
| 3,922,490 | 11/1975 | Pettis | 340/870.07 |
| 3,937,889 | 2/1976 | Bell et al. | 179/2 DP |
| 4,171,467 | 10/1979 | Evenchik | 179/2 DP |
| 4,225,967 | 9/1980 | Miwa et al. | 370/74 |
| 4,399,440 | 8/1983 | Douglas | 340/870.11 |
| 4,449,218 | 5/1984 | Strehl | 370/76 |
| 4,504,831 | 3/1985 | Jahr et al. | 340/870.11 |

Primary Examiner—Douglas W. Olms
Attorney, Agent, or Firm—Peter C. Van Der Sluys; Robert A. Hays

[57] ABSTRACT

A data transport system connects with a telephone system for communication of data via subscriber telephone lines to a provider of data services. Connection of multiplexing circuitry to a set of subscriber lines is accomplished at a main distribution frame by adapters or access blocks set between arc suppressors and a terminal block. The multiplexing circuitry is activated by signals of a line scan unit which, in turn, cooperates with a host computer associated with the provider of data services. This arrangement bypasses the central switching equipment. The data may be transmitted out of voice band, if desired, to enable simultaneous voice and data transmission. Passive, active and interactive data can be transmitted by the data transport system.

12 Claims, 12 Drawing Figures

INFORMATION TRANSPORT SYSTEM EMPLOYING TELEPHONE LINES

BACKGROUND OF THE INVENTION

This invention relates to the design of an information transport system for providing data services over existing telephone lines without interference with existing voice services supported by the telephone network. In particular, the system achitecture permits the invention to support multiple types of subscriber data services.

Telemetry and information transport is useful in providing passive services, active services and interactive services. The provision of such services is of particular interest where a multiplicity of subscribers are engaged with one or more providers of such services. These services will now be described in further detail.

In passive services, the data to be transmitted over a network is of relatively "bursty", i.e. small quanta of data with relatively low frequency of occurrence, particularly in those situations wherein the critical function of time for retrieval is low. For example, the data generated by utility meters, such as water, gas, and electric meters is generated locally, at the site of a subscriber to the telemetry service, changes slowly and is stored on site and need not be retrieved at intervals, generally less frequent than once an hour. Data of passive services is further characterized in that the rate of retrieval of the data is determined by the user of the data, such as the billing company, rather than the originator of the data, namely, the meter with its encoder.

Attempts to retrieve such information have been made at various times by various equipment manufacturers. Systems which have been developed for retrieval of such data can be classified as (1) dial-up systems, (2) call-discrimination systems, and (3) polled systems. These systems have generally been implemented by use of existing telephone switches to connect the user of the data with the originators of the data. Alternatively, dedicated full time lines are used, for example, with industrial customers of many utilities.

In the use of a switched telephone network for polled and call-discrimination systems, there is the possibility of overloading the traffic handling capability of the telephone exchange, as well as operating with delays inherent with the establishment of a connection through the network. Currently available polled systems are designed for either specific applications, such as a single user, or are designed with interfaces which are capable of interfacing only with a single type of encoder. The expandability of such systems and the capability to interface with more than one type of encoder is a significant limitation in the use of the concurrently available systems. In the case of dedicated lines to gather the data there is an economic disadvantage of full time line charges.

At the present time, all polled systems require certain common equipment located at the telephone exchange. This equipment must be connected to the main distribution frame manually and, in many cases, such connection requires a complete rewiring of the main distribution frame. The cost of such rewiring frequently requires two flexible connections where one previously existed. The added cabling and wiring in the limited space of the distribution frame presents a major constraint in many applications. Each one of the common equipment systems is capable of being enlarged only to the capacity of most medium sized telephone exchanges (10,000 lines) and do not lend themselves to facile expansion or networking of the system.

Active services relate to the situation wherein the information generated at the subscriber premises determines the need and the timing with which the data must be communicated to a remote site, as in the case the reporting of an alarm. In contradistinction to the passive services, the active services frequently require two-way communication from the subscriber premises to the provider of service, as would be the case with control functions such as the management of energy peak loads at the site of the subscriber.

Currently, there are two basic systems for handling the task of alarm reporting, namely, (1) dial-up systems (2) polled systems over dedicated lines.

Alarm reporting with dial-up systems is probably the most widely available technique. The major drawback is the ease with which the alarm reporting function can fail, without notification of the failure, if breakdowns on the transmission line or the equipment itself occur.

Polled systems installed over dedicated telephone lines are also in current use. The polled systems require dedicated subscriber line pairs for operation, and represent an extra economic burden to the telephone plant. Also, their cost, due to the inherent nature of the service, is high.

Telemetry or information transport systems for control functions, when implemented in the framework of a network, have been done to the present time, generally, over power line, carrier based systems.

Interactive services are those wherein human intervention occurs at the subscriber premises. Thus, a human being is the originator, service requestor and an active participant in the transaction as would occur, by way of example, in the transmission of video text.

A system for providing data communication between a human operated terminal and a remote service provider is implemented usually by a switched telephone network wherein dial-up type modems are employed to transport the information between the human operated terminal and the remote service provider. Such a system requires the establishment of a connection via the switched telephone network which remains in place throughout the duration of the time interval during which the interactive service is provided. During such interval, only minor effective utilization of the communication channel of the telephone network is attained. Also, during this period of time, the network and the subscriber pair in use remain unavailable to the subscriber for normal voice telephone service.

Thus, a problem exists in that no system is presently available to provide an overlaid data network with existing subscriber line pairs, and which interconnects the individual subscriber to the data services. Such is the case also with systems providing the foregoing active service and passive service.

SUMMARY OF THE INVENTION

The foregoing problems are overcome and other advantages are provided by a system incorporating the invention to provide bi-directional data services over existing telephone lines without interference with the existing voice services carried by the same telephone lines without loading the telephone switches. The system can support multiple types of subscriber data services, and is modularly expandable for use with multiple outside plant (O.P.) environments.

The system of the invention is constructed for an overlaid network which provides information transport capability without overloading the existing telephone plant. This capability is also provided without disturbing the existing voice service to subscribers and geographically distributable both within the telephone exchange and throughout the telephone network. The system provides improved utilization of existing subscriber outside plant. In accordance with the invention, the system is capable of providing and supporting data services including passive, active and interactive services.

The foregoing is accomplished utilizing existing subscriber loops and existing telephone exchanges. The interconnection of the inventive system with an existing telephone network permits upgrading and future modernization of the telephone exchange. Advantages of the invention are ease of installation, support of multiple services, reduced cabling at the telephone exchange, modular expandability, ability to handle remote units of the system, multiple means of access to subscriber stations, improved utilization of the outside plant, bi-directional utilization compatibility, and utilization with a variety of outside plant environments.

A particular feature in the implementation of the invention is the utilization of a plug, or adapter, at the main distribution frame which permits an interconnection of system wiring with individual ones of the subscriber lines without entailing any change breakage or repositioning of existing wiring within the main distribution frame including the flexible jumper-wire connections. The adapter is located at the site of a lightning arrester known as a primary protector, the adapter being formed to mate with groups of such arresters for connection with groups of subscriber lines. Since such arresters are commonly used in telephone exchanges, the invention can be readily installed. Suitable multiplexing circuitry is then connected by these adapters whereby the service provider can be connected with any one, or a plurality, of designated subscribers.

BRIEF DESCRIPTION OF THE DRAWINGS

The aforementioned aspects and other features of the invention are explained in the following description, taken in connection with the accompanying drawing wherein.

DETAILED DESCRIPTION

The system of the invention can be used, but is not limited to, the following applications: (1) passive services including water meter reading, gas meter reading, electric meter reading, oil consumption meter reading, and cable T.V., pay-per-view systems; (2) active services including alarm reporting from subscriber premises, peak load management, down loading of decoding algorithms for cable T.V. or direct broadcast satellite decoders; and (3) interactive services such as reverse channel for cable T.V. supported videotext, bank-at-home data services, and automated catalog ordering. The system may also be used for telephone company plant management purposes such as scanning and monitoring the status of spare cable plants, or monitoring the status of working lines to provide automatic failure reports on outside telephone plants.

The system of the invention includes equipment which is located at the subscriber premise, equipment which is located in the central exchange, and adapters for interconnecting the central exchange equipment with the individual subscriber lines. Before describing the system in detail, a description of physical and electrical characteristics will first be provided for the adapters which will be referred to, hereinafter as access blocks due to their physical shape and their function of providing access of the multiplexing equiment to the individual subscriber lines. The description of the access blocks is provided with reference to the FIGS. 1-8.

Figure 1:
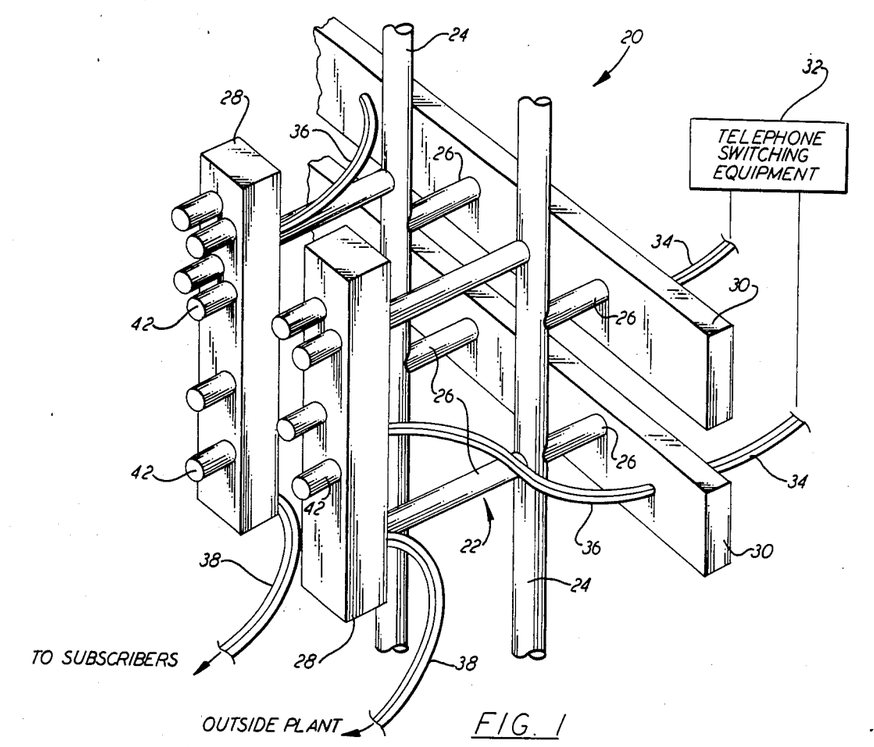
FIG. 1 shows a stylized view of a main distribution frame prior to installation of the access block and multiplexing equipment of the invention.
Figure 2:
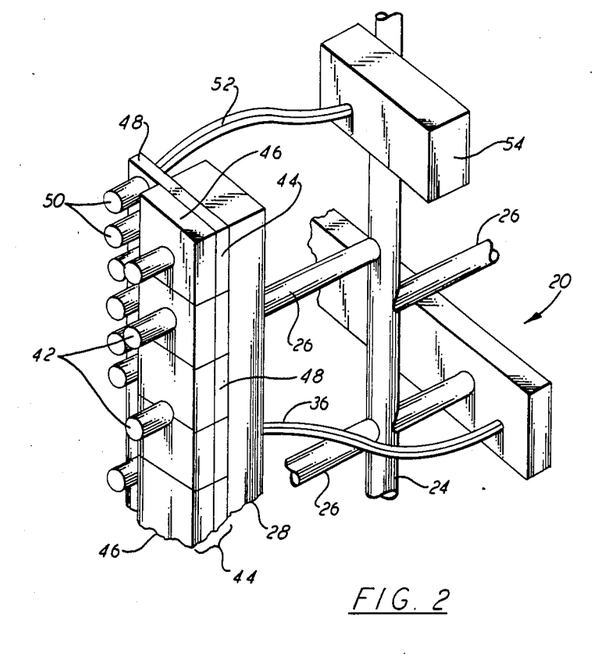
FIG. 2 shows the location of an access block an multiplexing equipment of the invention upon the main distribution frame of FIG. 1.

With reference to FIGS. 1 and 2, there is shown a main distribution frame 20 constructed in the form generally utilized in telephone central switching offices. The pictorial representations presented in FIGS. 1 and 2 have been stylized so as to show only those features of a main distribution frame which are essential to an understanding of the invention.

The frame 20 includes a frame member 22 that may be formed of upright legs 24 and horizontal struts 26 extending from the legs 24. A set of input vertical terminal blocks 28 and a set of output horizontal terminal blocks 30 are supported at the outer ends of the struts 26.

The horizontal blocks 30 are used for connecting telephone lines to service functions internal to the wire center on which the external plant cables are terminated. An example is to connect to the line circuits of a telephone switching exchange 32, indicated diagrammatically, via cables 34. Connection of telephone lines between the vertical blocks 28 and the horizontal blocks 30 is accomplished by individual flexible wire connections 36 frequently called "crossconnections" or "jumper wires." Connection of telephone lines between the remote locations of subscribers and the vertical block 28 is accomplished by outside plant cables 38.

While only a such cables 34, 36 and 38 are shown in FIG. 1 to demonstrate the connection among the various elements of the frame 20, it is to be understood that numerous connections are present, and that such cables and jumper wires fill a major portion of the volume of space between the vertical blocks 28 and the horizontal blocks 30. Also, it should be noted that in a typical installation within a telephone central office, there are many tiers of the vertical blocks 28, one above the other, and many tiers of the horizontal blocks 30, one above the other. The cables to the subscriber 38 are normally subject to high voltages such as power lines and surges caused by electrical storms.

In accordance with the usual practice in the construction of main distribution frames, a set of protector blocks 40 each carrying a set of protector circuit modules 42 is positioned contiguous each vertical block 28 to provide electrical connection between the wires of the cables 38 and the modules 42. Typically, a complete vertical block 28 includes ten (10) protector blocks 40. The modules 42 include an arc protection circuit for discharging excess voltages to a protective ground. Such circuit is suitable for protection of the wiring in the central office from electrical discharges, such as lightning, which may strike telephone lines coupled between the remote subscriber locations and the central office. The vertical blocks 28 serve as a connecting element whereby the individual subscriber telephone lines can be connected via well-known feed-through terminals (not shown in FIGS. 1 and 2) to terminals (not shown in FIGS. 1 and 2) of the protector block 40. Preferably, the block 28 also contains means for access to the wires for testing purposes by substitution of a test plug for the protector 42.

In accordance with the invention, an access block 44 is positioned between each protector block 40 and its corresponding vertical block 28. This may be seen by a comparison of FIGS. 1 and 2. FIG. 1 shows the arrangement prior to insertion of the access blocks 44 while FIG. 2 shows the arrangement upon insertion of an access block 44 between a protector block 40 and a vertical block 28.

In particular, it is noted that the access block 44 is made sufficiently thin, in accordance with a feature of the invention, so as to fit between a protector block 40 and a vertical block 28 without requiring any significant space in an already crowded central telephone office. In accordance with a further feature of the invention, the access blocks can be inserted without the disruption of the wiring in the harnesses 38 and 36. This management, thereby insures integrity of the telephone system during installation of the access blocks 44.

While an access block may be formed with the same dimensions of width and length as a protector block, it has been found to be most beneficial to construct the access blocks of a much smaller size. Such smaller size blocks can then be inserted as a set of the access blocks 44, as depicted in FIG. 2, side by side along the interface between a protector block 44 and its corresponding vertical blocks 28. The advantage of this arrangement may be appreciated from a realization that the terminals of the protector block 44 and of the vertical block 28 may become oxidized, or otherwise roughened so as to require more physical strength, on the part of installation personnel, than would be desirable in the connection of an access block to the vertical block and to the protector block.

Accordingly, the access blocks have been formed as a set of blocks 44 which are substantially smaller than either the protector block 40 or the vertical block. For example, in the case of a protector block 40 having five modules 42 per row, and twenty rows of the modules 42, ten access blocks 44 would be provided for each protector block 40. Each access block 44 would contain terminals to mate with ten sets of terminals corresponding to the ten modules 42 in two rows in the array of modules 42 carried by a block 40.

Thereby, each access block 44 need mate with only one-tenth of the terminals on a complete protector block 40 so as to greatly facilitate the interconnection of an access block 44 with a vertical block 28. During the installation of the access blocks 44, the blocks would be installed one at a time in side-by-side arrangement along a vertical block 28. Thereafter, the protector block 40 would be installed upon the set of access blocks 44.

Figure 3:
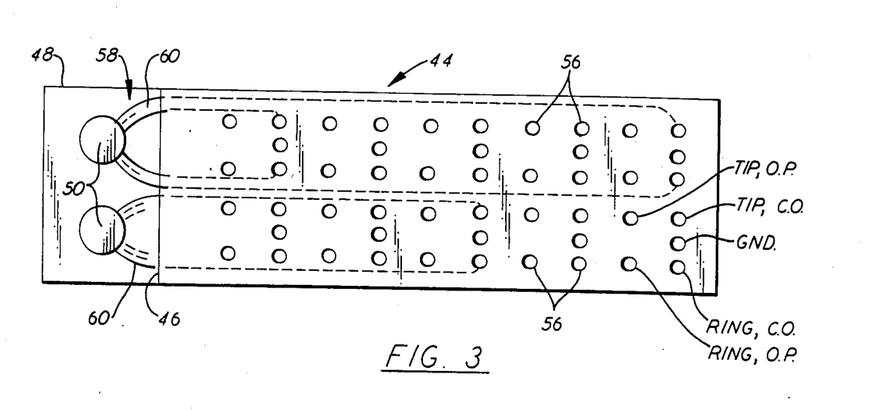
FIG. 3 is a plan view of the access block of FIG. 2.
Figure 4:
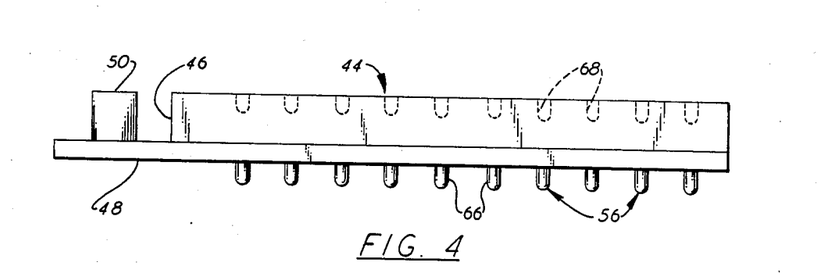
FIG. 4 is a side elevational view of the access block of FIG. 2.
Figure 5:
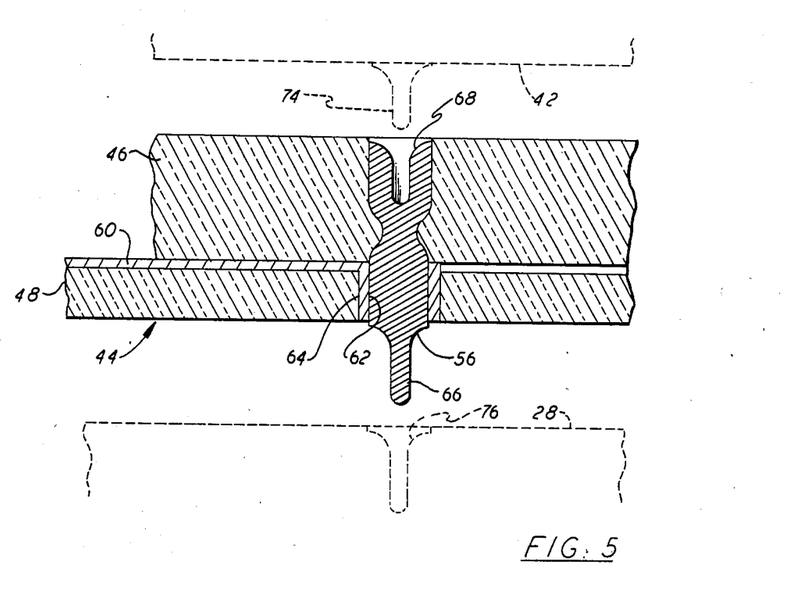
FIG. 5 is an enlarged sectional view of the access block of FIG. 2 showing a terminal passing through the block.

With reference also to FIGS. 3, 4 and 5, each access block 44 includes a base 46, a board 48 having a printed circuit thereon, and two multiplexers 50 constructed in the form of integrated circuit (IC) modules. All of the multiplexers 50 on the set of ten access blocks 44 supported by a single vertical block 28 are coupled via a harness 52 to a line scan unit 54 which is mounted on a leg 24 of the frame 20.

In each access block 44, the base 46 may be secured to the board 48 by an adhesive, or other well known mounting means such as screws (not shown) to provide rigidity to the block 44. In one embodiment the board 48 extends beyond the end of the base 46 to provide space for housing the multiplexers 50. One multiplexer 50 is provided for each row of the protector modules 42 and, accordingly, services five sets of telephone lines corresponding to the row of five protector modules 42 in the foregoing example of the protector block 40. Thus, the two multiplexers 50 in each access block 44 service a total of ten subscriber telephone lines.

Each access block 44 further includes an array of feed-through terminals 56 set within the base 46, and a printed circuit 58 disposed on the board 48. Individual conductors 60 of the printed circuit 58 connect the multiplexers 50 with specific ones of the terminals 56 as will be described more fully with reference to FIGS. 3 and 6.

Each terminal 56 passes through an aperture 62 in the board 48, each aperture 62 having a metallic, cylindrical insert 64 which makes a press fit against a terminal 56 so as to insure electrical connection therewith. Each of the conductors 60 terminates at an insert 64 to provide the foregoing electrical connection between a terminal 56 and a multiplexer 50.

Figure 6:
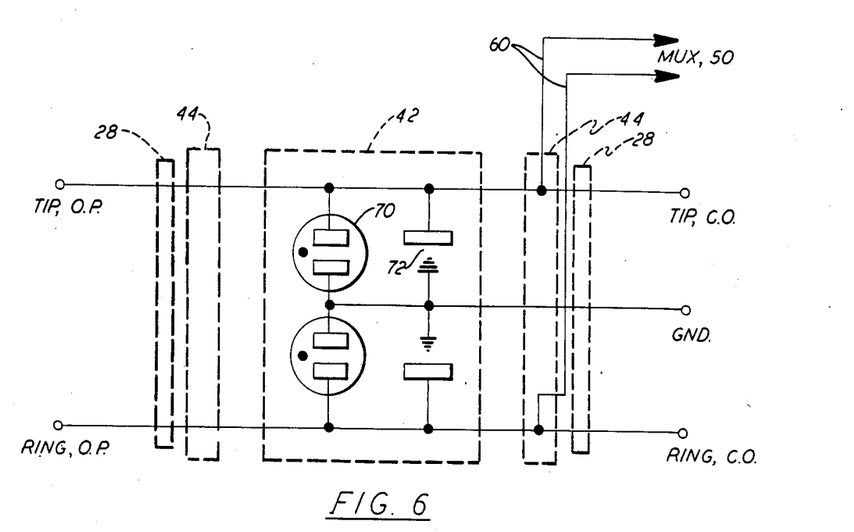
FIG. 6 is a schematic diagram of a lightning or surge protector for use in a protector circuit module of FIG. 1.

In FIG. 6, a module 42 is shown to have a protector circuit having a pair of gas-discharge devices 70 and a pair of fusible-pellet devices 72 which connect the tip and ring wires to ground. In the event that an excessively large voltage surge appears on the tip and/or ring wires, as would happen upon the occurrence of a lightning bolt, the devices 70 and 72 conduct the resulting current to ground so as to protect the equipment on the central office (C.O.) side of the module 42.

As shown in FIG. 6, the tip and ring wires pass from a location outside the plant (O.P.) through the blocks 28, 44, and 40, respectively, to reach the protector module 42. Thereafter, the tip and ring wires continue to pass by the blocks 40, 44 and 28, respectively, to reach the switching circuitry of the central office. Connection of the conductors 60 of a multiplexer 50 to the tip and ring wires is made in the access block 44 between the module 42 and the central office circuitry. FIG. 6 shows a total of five terminals for the protector module 42, these corresponding to the incoming and outgoing tip and ring wires, and the ground wire. The corresponding five terminals in each set of terminals is also portrayed in FIG. 3.

The layout of the feed-through terminals 56 in the access block 44 of FIG. 3 corresponds to the arrangement of the pins (not shown) of a protector module 42. The connection of the conductors 60 to the tip and ring wires for the central-office side of each of the modules 42 is also disclosed in FIG. 3 wherein a few exemplary ones of the conductors 60 are shown passing between the top surface of the board 48 and the bottom surface of the base 46.

Each feed-through terminal 56 is provided with a pin 66 at one end thereof and a socket 68 at the opposite end. The socket 68 receives a pin 74, shown in phantom in FIG. 5, of the protector block 40. The pin 66 mates with a socket 76 of the vertical block 28. Thereby, the configurations of the individual ones of the terminals 56 and their arrangement conforms to that of the pins 74 and the sockets 76 of the blocks 40 and 28 so as to permit the physical and electrical connection between the block 44 and the blocks 28 and 40.

Figure 8:
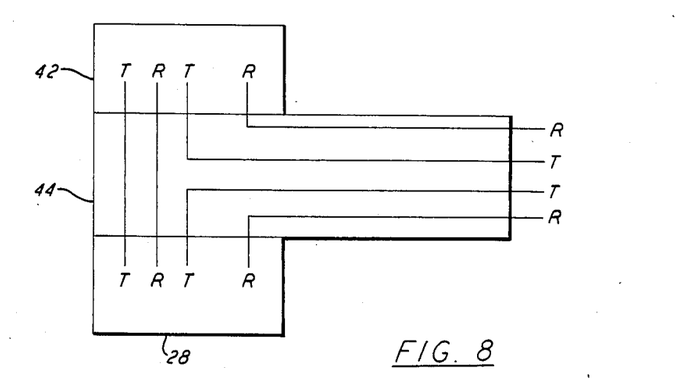
FIG. 8 is a schematic diagram of another embodiment of an access block.

If desired, the foregoing access block may be modified as shown in FIG. 8 to bring out pairs of wires to multiplexing or other circuitry for which acesss is desired. While the electric interconnection is altered thereby, the physical connection to the other blocks remains the same.

Figure 7:
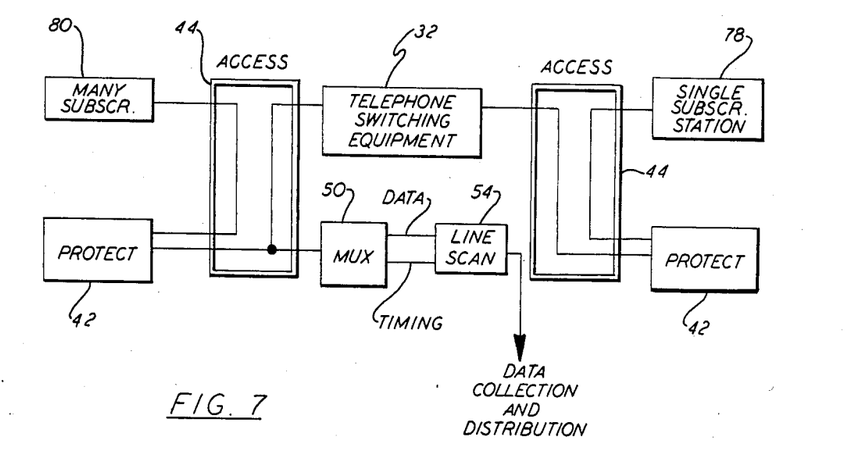
FIG. 7 is an electrical block diagram of the access block in circuit with a multiplexing system.

FIG. 7 shows the electrical interconnection between the many telephone subscribers who are to be serviced by the invention and a single station 78, which may also be a telephone subscriber and receive data from the many data transmitting subscribers 80.

Two forms of communication exist between the subscribers 80 and the station 78. First, there is the usual telephone connection via the telephone equipment 32. This mode of communication is available when one of the subscribers 80 telephones the station 78. For such communication, the telephone line passes from the subscriber 80 via the access block 44 and a protector module 42 to the cross-switch matrix 32 and, thereafter, via an access block 44 and a protector module 42 to the station 78. The second communication path from the many subscribers 80 to the single subscriber station 78 is via the access provided by the MUX 50 and line scan 54. From the line scan 54, connection may be completed to subscriber 78 as discussed below with reference to FIGS. 9 and 10.

Figure 9:
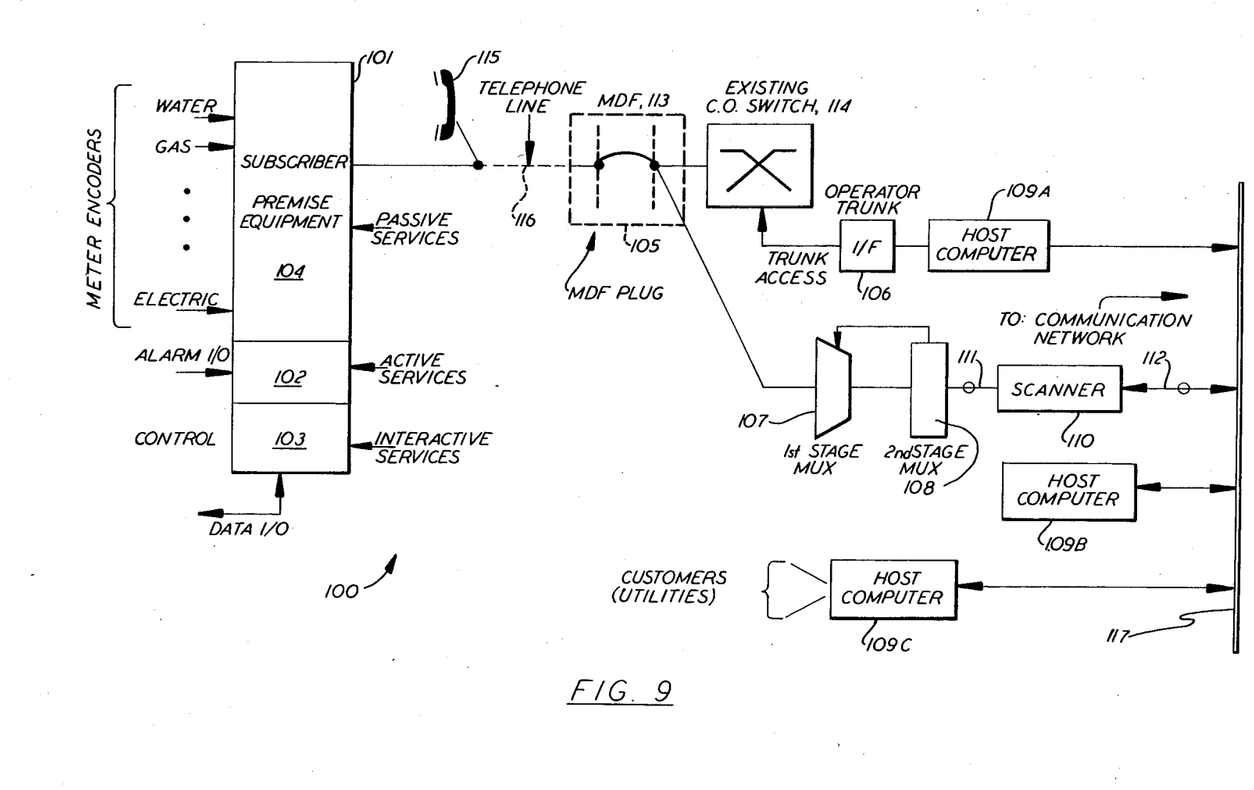
FIG. 9 is a block diagram of a telemetry system incorporating the invention.

With reference now to FIG. 9, there is shown a telemetry system 100 incorporating the invention. The system 100 includes subscriber premises equipment 101 which includes units 102, 103 and 104. The unit 102 provides for active services such as the interconnection with an alarm. The unit 103 provides interconnection for interactive services. The unit 104 provides for interconnection with encoders (not shown) of the utility meters such as water, gas and electric meters and interconnection with the telephone line 116 and a means for transmitting and receiving data over telephone lines, such as modem. Some form of bridged connector plug 105 at the central office main distribution frame, such as the preferred access block 44 of FIG. 2, provides for connection with a main distribution frame.

Also shown in FIG. 9, is an existing central office switch 114 operator verification for test trunk interface 106 as normally provided by the particular type of central office switching equipment, a first stage multiplexer 107, a second stage multiplexer 108, a plurality of host computers 109 individual ones of which are further identified by the legends A, B, and C, and a scanner 110. The first stage multiplexer 107 provides for interconnection of a relatively small group of telephone lines such as is provided by the multiplexer 50 of FIG. 2. The functions of the second stage multiplexer 108 and the scanner 110 correspond to the functions of the line scan unit 54 described briefly hereinabove with reference to FIG. 2. The second stage multiplexer 108 provides for interconnection of the analog signals from a plurality of the first stage multiplexers 107, and also provides a convenient location for any analog-to-digital conversion of these signals for subsequent communication via the scanner 110 to a host computer 109. Where only one first stage multiplexer 107 is shown in FIG. 9, it is to be understood that additional multiplexers 107 are disposed at numerous sites throughout the main distribution frame. The scanner 110 develops the requisite address and control signals for operation of the second stage multiplexer 108, and for selecting a specific one of the first stage multiplexers 107 and an individual subscriber line connected thereto.

Also shown in FIG. 9 are lines 111 and 112 by which connection is made, respectively, from the scanner 110 to the multiplexer 108 and from the scanner 110 to a host computer 109. Also included within the system 100 is a main distribution frame 113, a central office switch 114, a subscriber telephone 115 coupled to a subscriber line 116 and a data bus 117 by which data and command signals are communicated between the host computers 109B, the host computer 109C, and the scanner 110. The subscriber telephone line 116 passes from the subscriber premises equipment 101 via the main distribution frame 113 to the switch 114 for connection with other subscribers. In addition, a connection is made at the plug 105 from the line 116 to the first stage multiplexer 107.

It is recognized that not all applications of the system 100 will need to address passive, active and interactive services for each of the users, or subscribers, nor need the relative utilization of one type of service to be the same with respect to other types of service. Accordingly, the system 100 has been configured to allow expandability and adaptability to each subscriber while maintaining the integrated system concept for a given network.

The customer subscriber premise equipment 101 is a basic interface communication and control unit. The equipment 101 provides interfaces for a multiplicity of meter encoders in any combination of gas, water, electric or other service. The equipment 101 supports the communication and control elements for passive services and connects in parallel with the telephone line 116. For communication with a service provider, the equipment 101 can be accessed from the service provider host computer 109A, via the operator trunk interface 106, which interfaces to the trunk access mechanism of the existing central office switch 114. With such interconnection, the individual subscriber installations of the equipment 101 are to be polled for retrieval of the data supplied by the meter encoders. Also, the host computer 109A establishes the communication path to the operator trunk, and via the trunk access matrix, to each one of the individual subscriber lines 116.

Thereby, the system 100 provides a connection between service provider and subscriber that is a transparent one throughout the network from the equipment 101 to the host computer 109A. Alternatively, communication transport protocols and data rate changes may be included in the scanner 110. In turn, this allows in-band communication and signaling between the provider and the subscriber without generating traffic to the existing central office switch. Also, it should be noted that, in one embodiment, the communication from the scanner 110 may be accomplished by using in-band signalling communication via modems 104 at rates of 300-1200 baud without requiring the intervention, or use of ringing current to activate the equipment 101. This negates the need for call-discrimination techniques at the subscriber site. With the foregoing use of the system 100, each subscriber line can be polled often thereby allowing for retrieval of data from the meter encoders at rates much higher than those currently attained by manual methods.

When a given subscriber location requires provision for supporting active services, the unit 102 is incorporated within the equipment 101. This allows interfacing with the aforementioned alarm signal and the provision of an alarm input and output ports as well as control ports of the unit 102. Communication is accomplished by use of the transmission and control mechanisms available in the equipment 101 in the same fashion as described for the passive services.

In order to ensure availability of a communication path to and from the subscriber termination at anytime, each one of the subscriber lines is connected to the subscriber data network, the data made available by the equipment 101 from the main distribution frame utilizing the connector plug 105. As noted above, the plug 105 interfaces to the multiplexers 107-108 and the scanner 110 which controls the overall operation and communication of a group of subscriber lines. The scanner 110 may be viewed as an interfacing of a group of lines to the whole communication network for attaining access to and from the host computers 109. The computers 109 represent the service providers and customers for the active services. This implementation of the system 100 is also capable of supporting the passive services thereby eliminating the need for the trunk access 106 which is useful when only passive services are to be provided. The foregoing use of the system 100 also permits expansion from small systems and small exchanges to larger systems and larger exchanges.

The cabling and installation procedures are facilitated by use of the plug 105, actually a set of plugs wherein one plug is used for each group of subscriber lines as described above with respect to the preferred use of the access block 44.

With respect to interactive services, incorporation of the unit 103 within the equipment 101 provides for connection of data interfacing devices of the subscriber to the system 100. The unit 103 makes use of the transmission and control mechanism of the equipment 101 for the passive services and, in applications which so require, allows direct interfacing to the telephone line. Transmission from the interactive service unit 103 is accomplished by means of simultaneous voice plus data, such as data over voice, techniques wherein modulated data is transported over the telephone line in a frequency band above the voice band, thereby to permit the two forms of communication to occur simultaneously. The data over voice information is extracted at the main distribution frame 113 via the adaptive connection 105 and the first stage multiplexer 107 handling those lines, with the appropriate class of service and with filters for separating the bands of interest. In many cases a serial blocking filter is needed to prevent the data signals from interfering with the voice signals into the telephone central office switch. However, when a serial blocking filter is required the design of the adaptor allows for insertion of same without disrupting the existing wiring at the main distribution frame. Thereby, the data can be extracted and fed into the second stage multiplexer 108 which, in turn, transmits the data through the scanner 110 and into the communication network. The data is coupled via the communication network, in particular the bus 117, to a host computer 109 allowing control and access interfacing to the data service providers. The data-over-voice transmission permits two-way communication between the service providers via the host computers and the communication network, the scanner, and the multiplexer units 107-108 associated with the particular telephone lines 116.

With respect to the construction of the equipment 101, it is constructed as a self-contained functional module which is located at the end of the subscriber telephone line and physically placed in or outside the subscriber dwelling. The unit 101 provides line transmission interfacing, power extraction from the telephone line, means such as modems or a dual tone multi-frequency transmitter for transmitting and receiving modulated data, and, preferably, is provided further with a supervision and signalling control mechanism in the form of a microprocessor which provides intelligence for the units to communicate with the network of the system 100 and to receive and interpret the commands for interrogating the meter encoders which may be attached to the input ports of the equipment 101.

The microprocessor (not shown) of the equipment 101 contains the complete program necessary to handle both the communication protocols over the telephone line as well as for detecting internally-generated alarms such as an alarm indicating external tampering with the box which encloses the equipment 101, as well as an alarm indicating loss of power, or low battery conditions. The equipment 101 also includes the necessary programs to handle the individual protocol of multiple meter encoders to allow flexibility of interfacing units in the field.

The equipment 101 connects in parallel with a telephone line in the same way as the telephone set 115, and the electrical behavior of the equipment 101 is of high impedance in the transmission inactive states to avoid interference with the normal telephone service.

With respect to the construction of the unit 102 providing the active services, the unit 102 is a self-contained module which provides input and output ports for alarm reporting equipment. The unit 102 also provides output drivers to provide control functions and furthermore provides means for connecting external power means for the interfacing circuitry within the unit 102. Also, the unit 102 includes an interface port compatible with the other equipment of the unit 101 to allow communication with such other equipment.

In accordance with a feature of the invention, the active service unit 102 generates an inaudible pilot signal that is sent over the telephone line 116 to allow monitoring of the line, thereby to ensure continuous monitoring of both the communication channel and the equipment 101 for detecting of alarms in the event of failure of any of the communication elements.

The interactive service unit 103 has the capability of interfacing with other circuitry of the equipment 101, or directly with the telephone line 116 so as to provide a data port for an RS232 type of compatible data port by the subscriber. The unit 103 is microprocessor based and utilizes local sourced power for its operation. The unit 103 includes interfaces for control and transmission handshaking with the equipment 101 for alarm reporting in the event of failure. The equipment 101 is constructed to use an existing 2-wire telephone line by means of parallel connection to conventional analog telephones. Another embodiment allows it to connect directly to the designated telemetry channel of a telephone which uses digital techniques as in the Integrated Services Digital Network standard "D" channel as described in CCITT standards.

Figure 10:
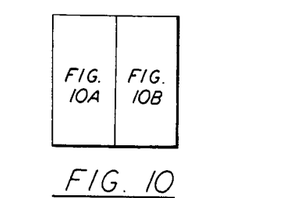
FIGS. 10, 10A & 10B are simplified block diagrams of multiplexing equipment of the system of FIG. 9.
Figure 10A:
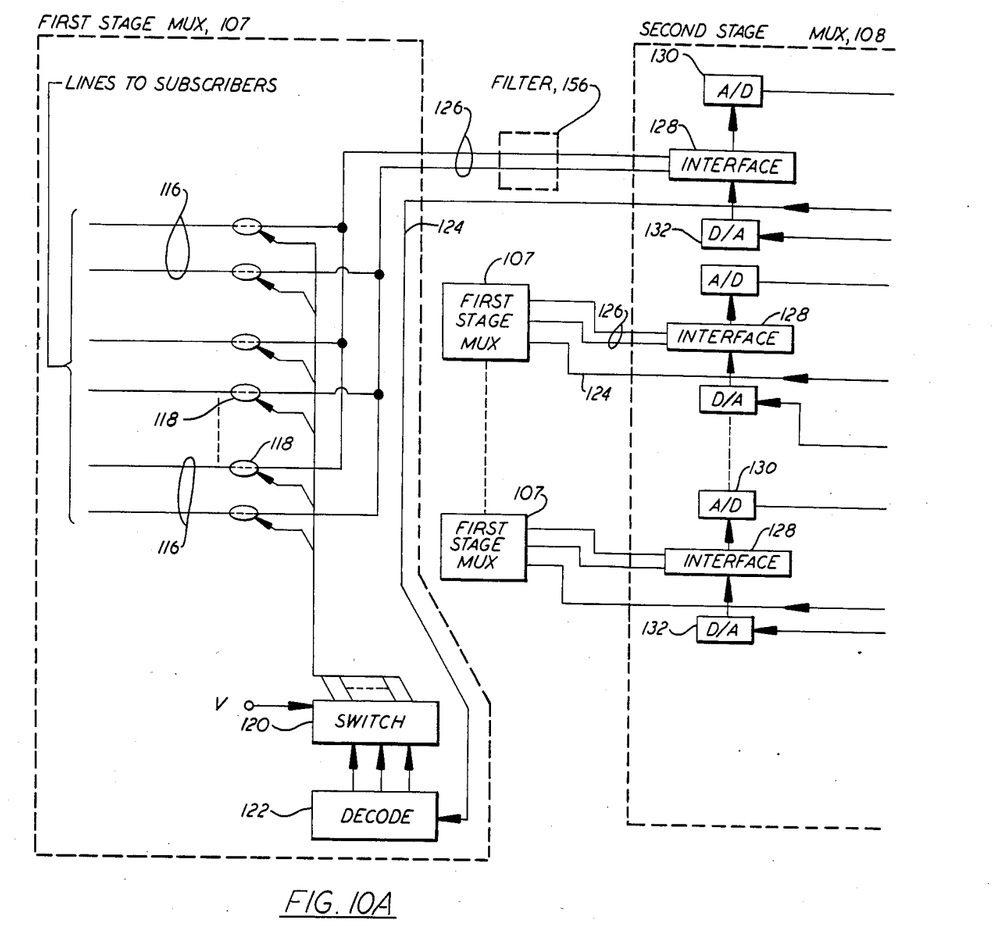
Figure 10B:
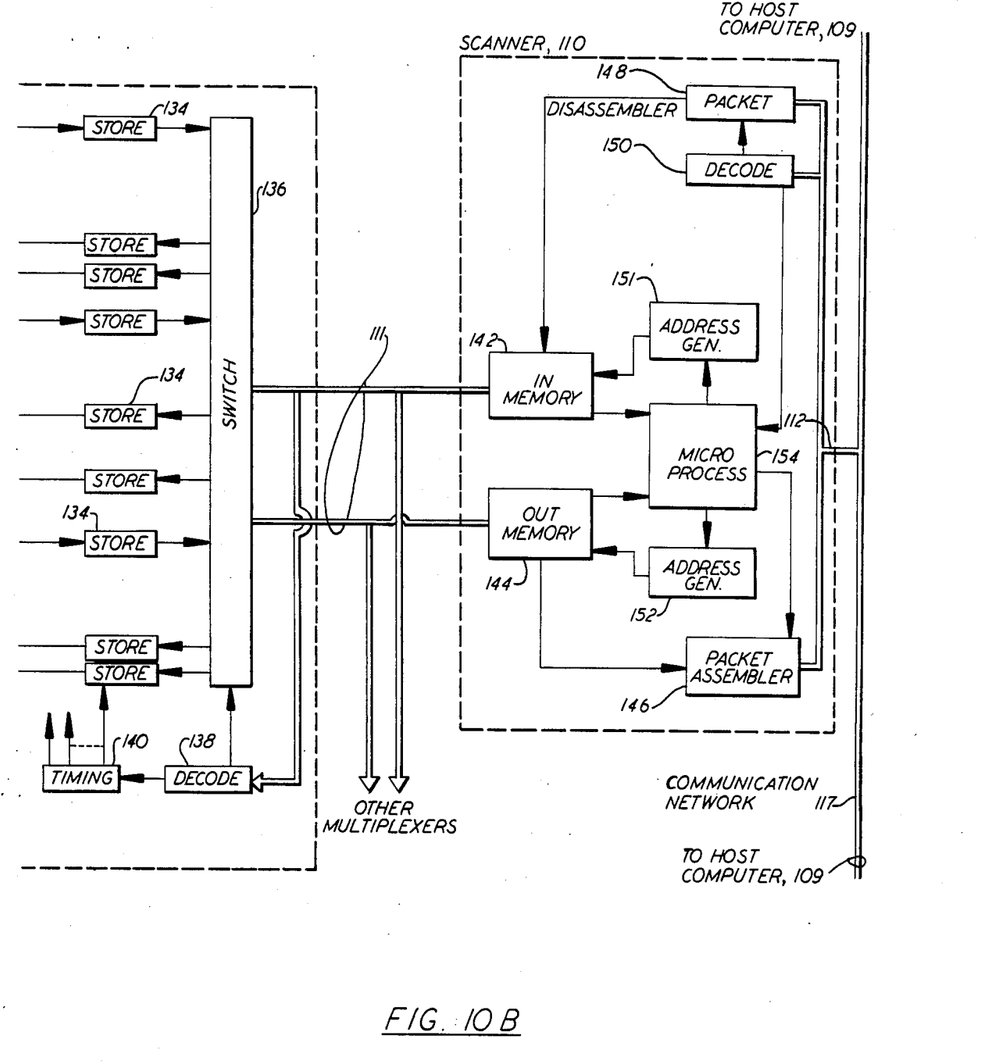

With reference also to FIG. 10, there is shown a simplified block diagram of one embodiment of the multiplexers 107–108 and the scanner 110 each of which includes well-known components, the showing of FIG. 10 being sufficient to explain further the general operation of the multiplexers 107–108 and the scanner 110. In the first stage multiplexer 107, individual subscriber telephone lines 116 are coupled by a pair of electrically operated switches 118, such as that disclosed in the U.S. Pat. No. 4,170,740 issued in the name of Pernyeszi on Oct. 9, 1979 and assigned to the assignee hereof. These switches permit full access to the line bandwidth by the common line 126 when the pair of switches are closed. The multiplexer 107 further includes a switch 120 which applies a voltage V to selected ones of the switches 118 to operate the selected switches 118. The switch 120 is, in turn, activated by a digital signal from a decoder 122. The decoder 122 is responsive to a digital control signal on line 124 for directing the switch 120 to operate the pair of switches 118 in accordance with the construction provided on the line 124.

As long as a pair of switches 118 are closed all signals (voice and data) from the subscriber lines 116, as coupled via the switches 118, are transmitted along the common line 126 having a pair of wires to and from the second stage multiplexer 108. The command signals on line 124 are provided by the multiplexer 108 which selects which lines 116 are to be connected to line 126. The foregoing arrangement with signals communicated via the lines 124 and 126 applies also to other ones of the first stage multiplexers 107 connected to the multiplexer 108. This permits the sampling of lines 116 under control of the second stage multiplexer 108.

The second stage multiplexer 108 includes a set of interface units 128, a set of analog-to-digital converters 130, a set of digital-to-analog converters 132, a set of storage units 134, a switch 136 and a decoder 138.

With respect to each of the lines 126, the interface unit 128 couples the converters 130 and 132 to the interface line 126 associated with each of the multiplexers 107. Outgoing signals propagating along the line 126 from a subscriber are coupled to the converter 130 which converts these signals to digital format for storage in the storage unit 134. Similarly, incoming signals in a digital format stored in the storage unit 134 are converted by the converter 132 to analog format, and are then applied via the interface units 128 to the line 126 for transmission to the subscriber. The address of the specific subscriber from which data is being received from or to which data is being transmitted, is also stored within a storage unit 134 coupled to the line 124. Thereby, the storage units 134 contain ingoing data, outgoing data, and the address of the subscriber associated with the foregoing data. The use of the storage units 134 permits the reception of data at a storage unit 134 and the transmission of data from a storage unit 134 to be done at different rates. This is accomplished by strobing the storage units 134 with clock pulses from a timing unit activated by signals from the decoder 138. The switch 136 is also operated by a digital signal from the decoder 138. The decoder 138 is responsive to incoming digitized command signals provided by the scanner 110 via incoming data bus 111. The decoder 138 decodes the instructions on the bus 111 to operate the switch 136 and to activate the timing unit 140. Thereby, signals from the set of storage units 134 corresponding to the selected telephone subscriber are coupled via the switch 136 to the bus 111 and by the bus 111 to the scanner 110. Also, control signals and data signals for individual ones of the subscribers are connected from the scanner 110 via the switch 136 to the communication channel associated with the selected subscriber. It is noted that each of these communication channels is identical, each channel having the three storage units 134, the two converters 130 and 132 and the interface unit 128.

The scanner 110 includes an incoming memory, an outgoing memory 144, a packet assembler 146, a packet disassembler 148, a decoder 150, two address generators 151–152, and a microprocessor 154. The memory 142 processes information coming from a host computer 109 via line 112 (a data bus) for subsequent reception at a telephone subscriber. The memory 144 is used in the processing of outgoing data from the telephone subscriber via line 112 and bus 117 to a host computer 109. The memories 142 and 144 are addressed by the generators 151–152, respectively in response to control signals applied to the generators 151–152 by the microprocessor 154. The decoder 150 detects the presence of an incoming message directed to the scanner 110 from the bus 117 and activates the microprocessor 154 to operate the generator 151 to address a slot in the memory 142 for receiving the incoming data. The incoming data arrives as a packet along the bus 117 and is first rearranged in a format suitable for storage in the memory 142 by the packet disassembler 148, such packetizing circuitry being well-known. The packet disassembler 148 is activated by a signal from the decoder 150 in response to the detection of an incoming message directed to the scanner 110. The packet assembler 146 is activated by the microprocessor 154 to extract data from the memory 144, the data being extracted from a slot addressed by the generator 152, to place the extracted data in proper format for transmittal along the bus 117. The proper format involves packetizing the data with the address of the host computer 109, the identity of the water meter or gas meter, or alarm, or interactive service, as well as the identity of the subscriber. These various identities, along with the data, are arranged in a preset format of packet by the packet assembler 146, under instruction from the microprocessor 154. The microprocessor 154 is responsive to signals provided by each of the memories 142 and 144 corresponding to addresses applied thereto, the signals indicating the presence of data stored within the respective memories, which data is to be processed. The microprocessor 154 is also programmed to recognize the presence of the pilot tone from an alarm circuit so as to immediately direct the transmission of the alarm by the packet assembler 146 to the appropriate host computer 109.

The foregoing description of the system's components disclosed in FIG. 10 provides for a carrying out of the purposes of the invention and enables the system 100 to operate in the manner described above.

In order to accommodate the extraction and separation of a data signal transmitted in a spectral region outside the spectrum of a voice signal, a filter 156 may be inserted on the line 126. The filter 156 has a pass band which envelopes the spectrum of the data and lies outside the voice spectrum so as to separate the two signals from the multiplexing process.

It is to be understood that the above described embodiment of the invention is illustrative only, and that modifications thereof may occur to those skilled in the art. Accordingly, this invention is not to be regarded as limited to the embodiment disclosed herein, but is limited only as defined by the appended claims and the reasonable interpretation thereof.

We claim:

1. A data transport system; said system comprises:
   means for interconnecting a flow of data on a plurality of telephone subscriber lines to a single transmission line, said transmission line communicating with a provider of data service, said interconnection means including means for addressing individual ones of said telephone subscriber lines in accordance with control signals transmitted to said interconnection means by said provider of data service;
   means located on a main distribution frame of a telephone system, for providing a connection between said interconnection means and said individual ones of said telephone subscriber lines without interference with existing wiring of said main distribution frame; and
   data communication equipment connected to each of said individual ones of said telephone subscriber lines, said data communication equipment including at least one passive service unit, each said passive service unit being individually addressable by a signal from said interconnection means, each said unit including means, responsive to said sgnal, for transmitting data without human intervention.

2. System as claimed in claim 1 wherein said data communication equipment further includes:
   at least one active service unit, each said active service unit being individually addressable.

3. System as claimed in claim 2 wherein each said active service unit is adapted for transmission of an alarm signal, each said unit transmitting an inaudible pilot tone in the absence of said alarm signal, said pilot tone being provided to improve the integrity of said system.

4. System as claimed in claim 1 wherein said data communication equipment further includes;
   at least one interactive data service unit, each said interactive service unit being individually addressable.

5. System as claimed in claim 4 wherein said data communication equipment further includes;
   at least one active service unit, each said active service unit being individually addressable.

6. System as claimed in claim 1 wherein each said passive service unit is adapted for transmission of utility data each said passive service unit having utility data each provided thereto by a different one of a plurality of meters combined with encoders.

7. System as claimed in claim 1 wherein said interconnection means further includes:
   means for switching an analog circuit to permit bidirectional communication of voice/data signals on any selected one of said subscriber lines.

8. System as claimed in claim 7 wherein said data signals are transmitted along said subscriber line in a spectral band lying outside the spectrum of said voice signals.

9. System as claimed in claim 8 wherein said interconnection means further includes:
   means in parallel with said subscriber line, for separating said data signals from said voice signals to allow said voice signals to be transmitted via switching circuitry of a telephone central office independently of the transmission of said data signals between said interconnecting means and said data communication equipment.

10. System as claimed in claim 9 wherein said interconnection means further includes:
    a plurality of first multiplexers, each said first multiplexer connecting to a number of said telephone subscriber lines having said flow of data;
    at least one second multiplexer, said second multiplexer interconnecting said plurality of first multiplexers and said single transmission line.

11. System as claimed in claim 10 wherein each said second multiplexer includes a digital-to-analog converter and an analog-to-digital converter associated with each said first multiplexer associated therewith.

12. System as claimed in claim 7 wherein said data signals are transmitted along said subscriber line in a spectral band lying within the spectrum of said voice.

* * * * *